United States Patent [19]

Hubble, III et al.

[11] Patent Number: 5,184,011
[45] Date of Patent: Feb. 2, 1993

[54] LINEAR ENCODER FOR DIGITAL PRINTING APPLICATIONS

[75] Inventors: Fred F. Hubble, III, Rochester; John M. Mitchell, Jr., Henrietta; James P. Martin, Rochester, all of N.Y.

[73] Assignee: Xerox Corporation, Stamford, Conn.

[21] Appl. No.: 635,837

[22] Filed: Jan. 3, 1991

[51] Int. Cl.⁵ .................................................. G01D 5/34
[52] U.S. Cl. ........................ 250/231.14; 250/237 G
[58] Field of Search ........... 250/237 G, 231.13, 231.14, 250/231.17; 356/375; 33/706, 707

[56] References Cited

U.S. PATENT DOCUMENTS

| | | | |
|---|---|---|---|
| 4,247,214 | 1/1981 | Swan, Jr. | 250/237 G |
| 4,533,268 | 8/1985 | Sanders, Jr. | 250/231.14 |
| 4,673,810 | 6/1987 | Babsch et al. | 250/237 G |
| 5,047,631 | 8/1991 | Frese | 250/237 G |
| 5,066,130 | 11/1991 | Tsukiji et al. | 250/237 G |

FOREIGN PATENT DOCUMENTS

59-5082   1/1984   Japan .

Primary Examiner—David C. Nelms
Assistant Examiner—John R. Lee
Attorney, Agent, or Firm—Finnegan, Henderson, Farabow, Garrett & Dunner

[57] ABSTRACT

The invention comprises a sensor system in a printhead scanner which is capable of achieving accurate pixel to pixel registration. A plastic film strip with alternating fiducial bars and spaces is scanned. A voltage pattern is triggered by the zero slope points of the voltage induced by a sensing mechanism being moved along the plastic film strip.

10 Claims, 6 Drawing Sheets

LINEAR ENCODER FOR DIGITAL PRINTING APPLICATIONS

BACKGROUND OF THE INVENTION

FIELD OF THE INVENTION

This invention relates to a sensor system in a printhead scanner and more particularly to a sensor and encoding scheme for reading printhead position along a scan line to provide low cost print registration that is both contamination and ambient light resistant.

A recurring problem for printers, copiers, and other related machines employing a printhead that scans across media to be imprinted is the accurate registration of the printhead, on a pixel to pixel basis, during printing. Often this is accomplished by an optical sensor mechanically coupled to the print carriage. As the printhead moves across media to be imprinted, a sensor beam is alternatively interrupted and transmitted by either a rotary or lineally disposed occluding means. A detector, commonly a phototransistor, receives the sensor beam and an alternating voltage pattern is formed by suitable amplification of the induced photocurrent which is then passed through a resistor. It is important that the alternating voltage pattern be triggered properly so that the printhead will print pixels which are aligned correctly.

DESCRIPTION OF THE RELATED ART

In conventional systems, an alternating voltage pattern produced by a detector and associated signal processing circuitry is compared with a predetermined reference voltage. Pulses are transmitted whenever the alternating voltage pattern waveform crosses the reference potential signal. The principle disadvantage of this so-called "level sensing" approach is that the crossing points are dependent on the amplitude of the detector output. Attenuation of the output signal may be caused by optical contamination, component degradation, and thermal effects. When the amplitude of the detector signal decreases to the point where it no longer reaches and crosses the level of the reference potential, the pulses will be erroneously transmitted, or cease to be transmitted.

Furthermore, in conventional systems, the drive roll may be provided with a metallic strip sensor provided with a plurality of slits as the occluding means. Such a metallic strip sensor is subject to eccentricities, and ambient illumination can produce unwanted reflections from the metallic surface which can result i difficulty in detecting the output of the light source.

Accordingly, it is an object of the present invention to provide a low cost, practical, and efficient printhead encoder capable of achieving desired print registration for printers, copiers, input scanners, and other related machines.

It is a further object of the present invention to provide a linear printhead encoder that is contamination and ambient light resistant.

It is a still further object of the present invention to provide a sensing technique wherein the triggering of the sensor takes place at zero slope points in the voltage pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects in accordance with the purposes of the present invention, as is embodied and described herein, the invention comprises an apparatus for achieving pixel to pixel registration with a linear printhead encoder, including means for providing a sensing beam, means for causing interruptions in the sensing beam when moving across a medium to be imprinted, means for detecting the interruptions and for producing a first voltage pattern based on the interruptions, and means for outputting a second voltage pattern which is triggered at zero slope points of the first voltage pattern.

The present invention also comprises a method for achieving pixel to pixel registration when moving across a medium to be imprinted, using a printhead encoder, including the steps of providing a sensing beam, causing interruptions in the sensing beam when moving across the medium to be imprinted, detecting the interruptions and producing a first voltage pattern based on the interruptions, and outputting a second voltage pattern that is triggered at the zero slope points of the first voltage pattern.

BRIEF DESCRIPTION OF THE DRAWINGS

The accompanying drawings, which are incorporated in and constitute a part of the specification, illustrate the presently preferred apparatus and method of the invention and, together with the general description given above and the detailed description of the preferred embodiment given below, serve to explain the principles of the invention. In the drawings.

Reference will now be made in detail to the present preferred embodiments of the invention, examples of which are illustrated in the accompanying drawings.

DETAILED DESCRIPTION OF THE PREFERRED EMBODIMENT

Figure 1A:
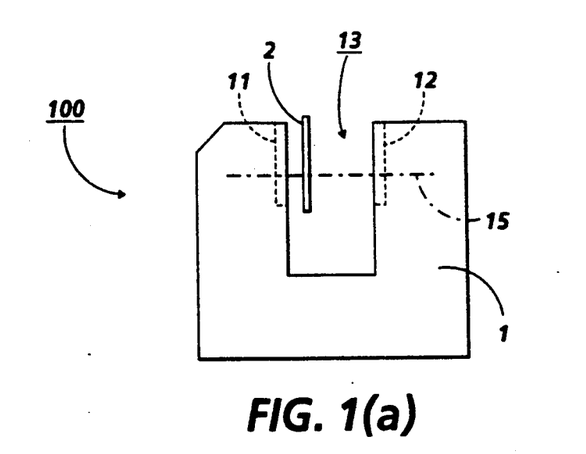
FIG. 1(a) is a side view of a preferred embodiment of the printhead encoder according to the present invention.
Figure 1B:
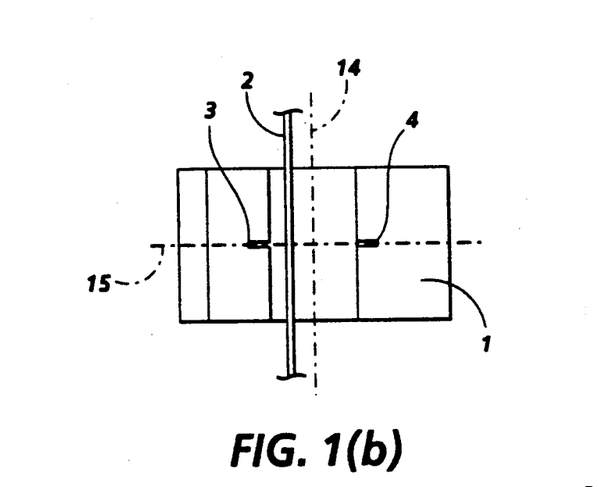
FIG. 1(b) is a top view of the printhead encoder of FIG. 1(a)
Figure 1C:
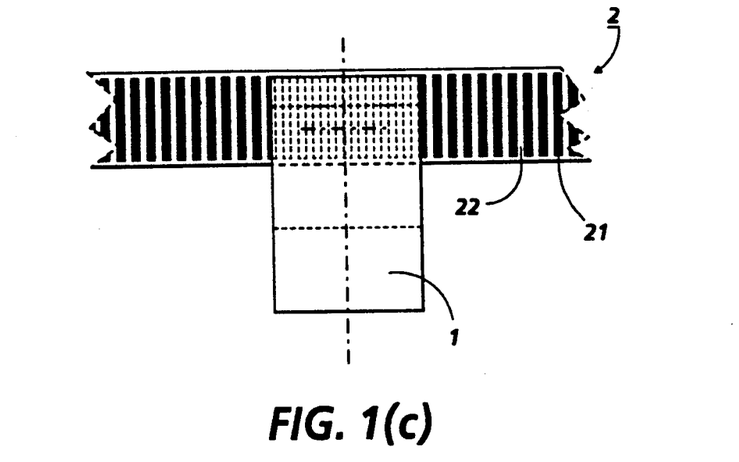
FIG. 1(c) is a front view of the printhead encoder of FIG. 1(a)

FIGS. 1(a)-(c) show a preferred embodiment of the printhead encoder 100 of the present invention. The printhead encoder 100 comprises a sensor housing 1 which is fastened to a printhead (not shown). The sensor housing 1 is constructed of polycarbonate and includes LED aperture area 11 and detector aperture area 12. A plastic film strip 2, the details of which will be discussed below, is passed through an open area 13 which is located at the nip of the sensor housing 1. The sensor housing 1 traverses bidirectionally along the plastic film strip 2.

FIG. 1(b) illustrates top view of the sensor housing 1. Particularly, FIG. 1(b) shows the plastic film strip 2 extending along an axis 14, which is transverse to an axis 15 of the sensor housing 1, also shown in FIG. 1(a). FIG. 1(b) also shows an LED aperture 3, located at the mid-point of LED aperture area 11, and a detector aperture 4, located at the mid-point of detector aperture area, both aligned along the axis 15 of the sensor housing 1.

FIG. 1(c) illustrates a front view of the sensor housing 1. This figure shows a front surface of the plastic film strip 2 across which the sensor housing 1 passes. The plastic film strip 2 includes equally spaced and appropriately dimensioned fiducial marks 21 and spaces 22. When the sensor housing 1 passes across the plastic film strip 2, the light emitted from the LED aperture 3, and detected by the detector through detector aperture 4, is interrupted by the fiducial marks 21. Details specifically of the plastic film strip 2 are discussed with reference to FIG. 2.

Figure 2:
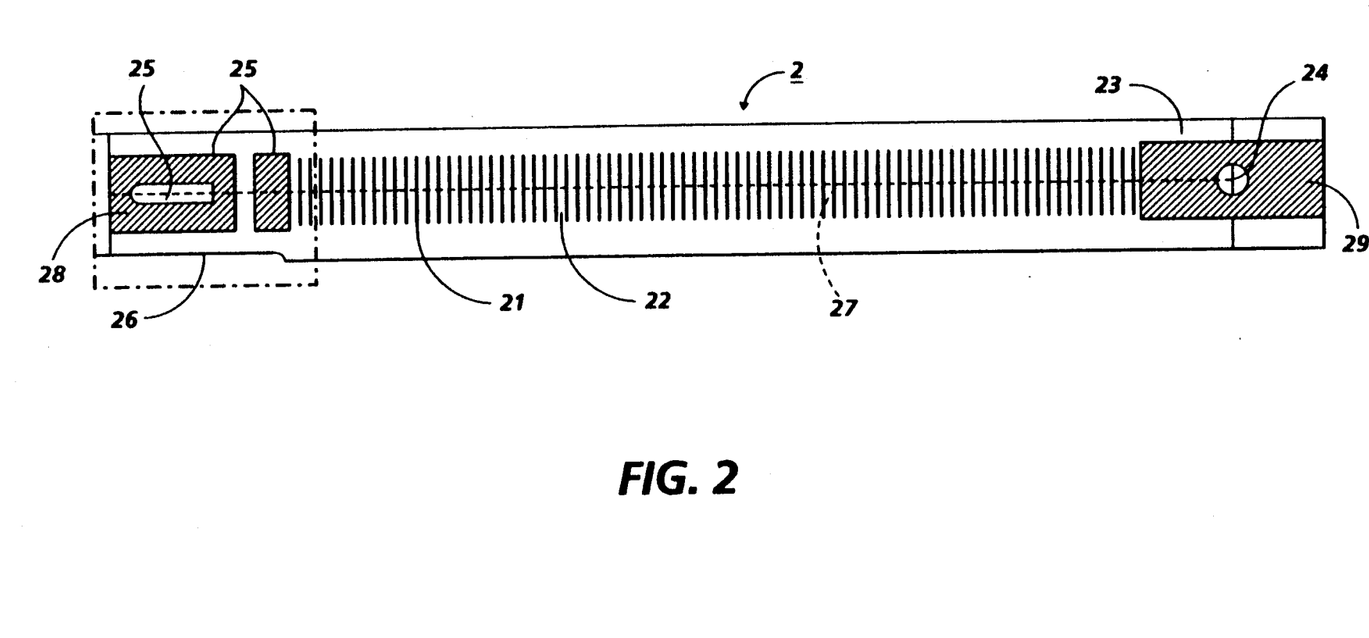
FIG. 2 is a front view of a plastic film strip shown in FIG. 1(c)

FIG. 2 shows a complete view of the plastic film strip 2 according to the present invention. Plastic film strip 2 preferably is constructed of a transparent flexible plastic film such as MYLAR or an equivalent plastic material.

The fiducial marks 21 are non-transmissive to light and preferably cover at least the central portion of the strip where printing is to occur. The fiducial marks 21 are placed at one-half of the desired pixel spacing. In particular, if pixel print density is desired to be 300 pixels per inch, then the fiducial marks are located at a density of 150 marks per inch, over the area of the strip to be covered. In the area surrounding fiducial marks 21, spaces 22 are provided which are openings in the emulsion. Spaces 22 are clear with a high light transmissivity.

The plastic film strip 2 also includes a hole 24 at one end 29, and a slot 25 at the other end 28. The hole 24 and slot 25 are aligned along the axis 27 of the plastic film strip, and are employed for attaching the plastic film strip 2 to the printer device being used. The fiducial marks 21 are transverse to the axis 27. The plastic film strip 2 further includes recessed end 26. This end has a width narrower than the remainder of plastic film strip 2.

Each end 28 and 29 of plastic film strip 2 is coated with an opaque material 23 similar to that which forms fiducial marks 21 and is thus also non-transmissive to light. By coating the end portions 28 and 29 of the plastic film strip 2 with the emulsion 23, ambient light will not erroneously trigger the sensor when the sensor housing 1 is located at one of the end portions 23.

The relationship between the plastic film strip 2 and the fiducial marks 21 will be explained with reference to FIGS. 3(a)–(c) and FIG. 4.

Figure 3A:
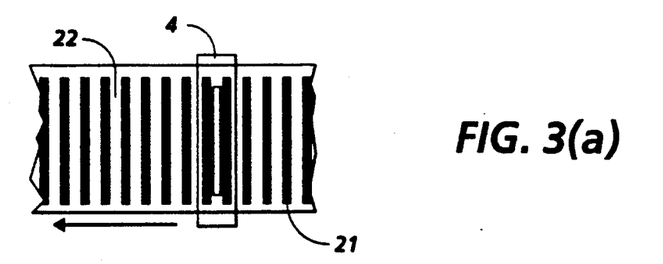
FIGS. 3(a)-(c) illustrate the positions of an aperture as a scanner moves across the plastic film strip.
Figure 3B:
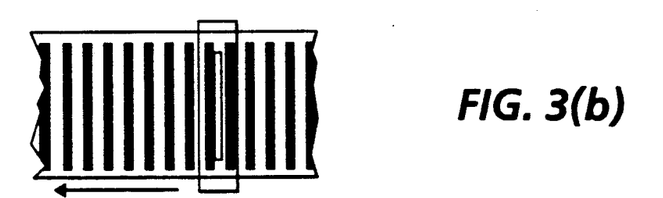
Figure 3C:
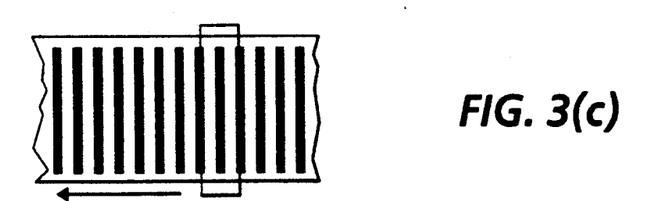
Figure 4:
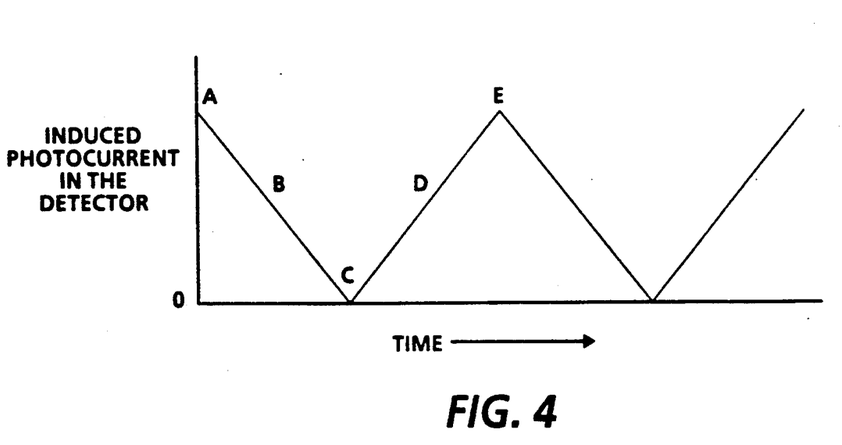
FIG. 4 is a graph showing the induced photocurrent versus time produced as the scanner moves across the plastic film strip.

As the sensor housing 1 is moved across the plastic film strip 2, the detector aperture 4 will receive varying amounts of light emitted from the LED aperture 3 because the detector aperture will become obstructed as the fiducial marks 21 pass over it. FIGS. 3(a)–(c) show stages of the detector aperture 4 as the sensor housing 1 is passed across the plastic film strip 2. FIG. 4 shows the corresponding photocurrent induced in the detector as the detector aperture 4 is varyingly obstructed by the fiducial marks 21. In FIG. 3(a), the detector aperture 4 is completely open because no part of any of the fiducial marks 21 obstructs the aperture. Therefore, the total amount of light from the LED aperture 3 will be transmitted to the detector aperture 4 and thus to the detector. As seen in FIG. 4, at a point A, the induced photocurrent in the detector will be a maximum value. As the sensor housing 1 is moved across the plastic film strip 2, the detector aperture 4 becomes partially obstructed, as shown in FIG. 3(b). At this point, only a portion of the light emitted by LED aperture 3 will be received by detector aperture 4. Accordingly, the induced photocurrent in the detector will decrease, as shown at point B in FIG. 4. Finally, the detector aperture 4 will become completely obstructed when one of the fiducial marks 21 completely blocks the detector aperture 4, as shown in FIG. 3(c). At this point, no light will reach detector aperture 4 from the LED aperture 3, and the induced photocurrent in the detector will equal zero, as shown at point C in FIG. 4. As the housing continues to move along, the fiducial mark gradually unblocks the detector aperture 4 and the induced photocurrent returns to its maximum value when the aperture becomes again unblocked.

Therefore, as shown in FIG. 4, the graph of the induced photocurrent versus time results in two zero slope points, point A when the detector aperture 4 is completely open, and point C, when the detector aperture 4 is completely blocked. Therefore, the detector is triggered twice for each fiducial mark 21, once at the instant when the detection aperture is entirely blocked and once at the instant when the detector aperture is entirely unblocked.

Accordingly, the measurement scheme of a preferred embodiment of the present invention is desensitized as compared with the sensing scheme of the conventional system which uses a metallic strip sensor with a plurality of slits. In the conventional sensing scheme, the detector is triggered once for each slit. Therefore, with the plastic film strip 2 of a preferred embodiment of the present invention, one-half the number of fiducial marks 21, compared with the slits of the conventional system, are needed. Accordingly, the fiducial marks 21 and the open areas therebetween may be made twice as wide, with the result that contamination from paper fibers, ink, or other optically disturbing material, does not as readily cause errors in the system.

Figure 5:
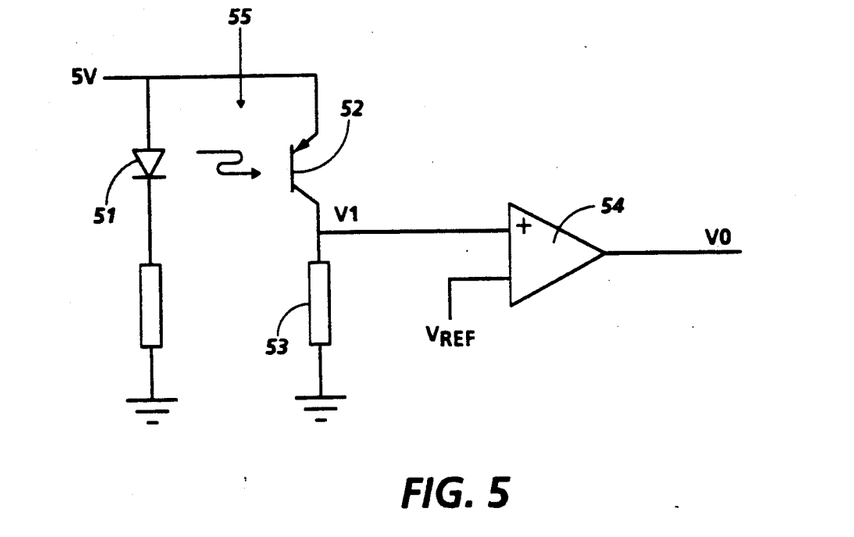
FIG. 5 is a circuit diagram of a conventional printhead encoder.

In the conventional registration circuit shown in FIG. 5, the signal waveform produced by a detector scheme is compared to a reference potential, $V_{REF}$. As shown in FIG. 5, LED 51 emits light that is interrupted by a strip sensor, such as the conventional metallic strip sensor discussed above, which passes through area 55. The resulting variation in transmitted light is detected by a phototransistor 52, and a voltage pattern V1 is produced across a resistor 53. Voltage V1 is compared to a reference voltage $V_{REF}$ by a comparator 54 and an output voltage V0 is produced.

According to the conventional approach illustrated in FIG. 5 pulses are transmitted, that is, V0 changes state from high to low or from low to high, whenever the voltage pattern V1 "crosses" the reference voltage value. The principle disadvantage of this approach is that the crossing points are dependent upon the amplitude of the detector output. Attenuation of the detector output, caused by optical contamination, component degradation, thermal and other similar effects, results in errors in the location of the triggering point of the sensor. When the attenuation of the detector output becomes greater than a predetermined value, the voltage V1, will fail to cross the reference voltage $V_{RED}$, and the output voltage will fail to be triggered by movement of the sensor past the fiducial marks.

Figure 6:
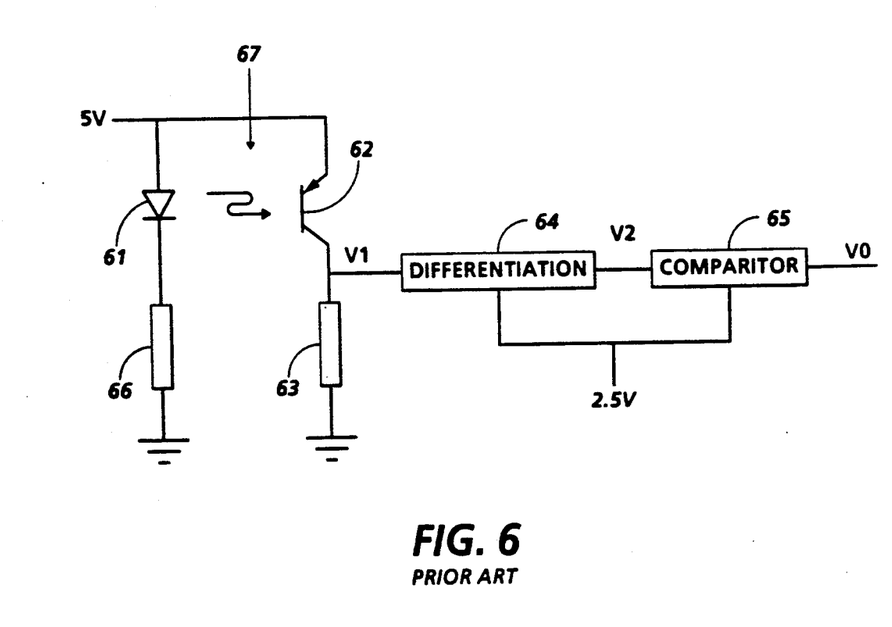
FIG. 6 is a block diagram of the circuit of a preferred embodiment of the printhead encoder according to the present invention.
Figure 7A:
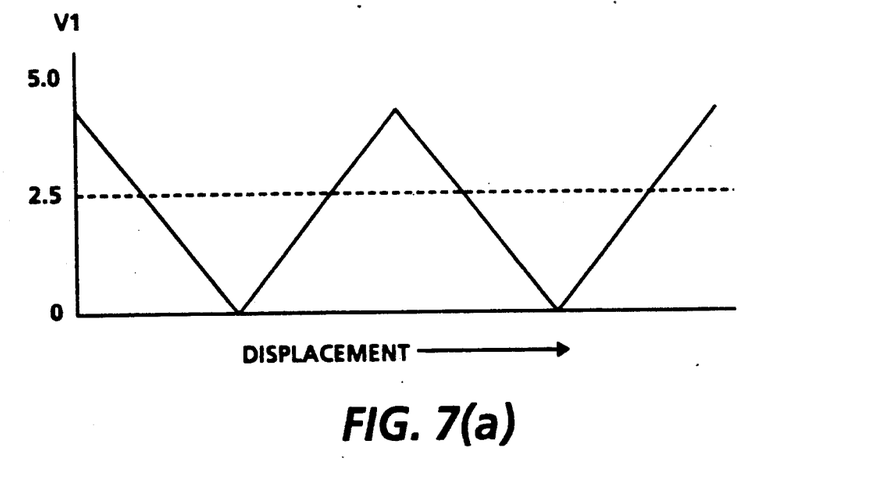
FIGS. 7(a)-(c) are graphs illustrating waveforms produced by the printhead encoder circuit shown in FIG. 6.

Accordingly, in order to prevent degradation of the sensing of the trigger output, in the present invention, triggering is accomplished at the zero slope points in the voltage pattern across resistor 63, illustrated in FIG. 6. In the circuit of FIG. 6, an LED 61 emits light through an aperture 3, that is interrupted by the fiducial marks 21 of plastic film strip 2 which passes through area 67. The resulting variation in transmitted light, as shown in FIG. 4, is detected by phototransistor 62 and comutated to a photocurrent. Due to the fiducial marks 21 on the plastic film strip 2, as discussed above, an alternating voltage pattern is produced across resistor 63, as shown in FIG. 7(a) by the photocurrent. If the fiducial marks 21 and the spaces 22 between the marks are substantially equal in width to the aperture of the phototransistor 62, then the voltage pattern V1 across resistor 63 will result in a sawtooth pattern as shown in FIG. 7(a).

Figure 7B:
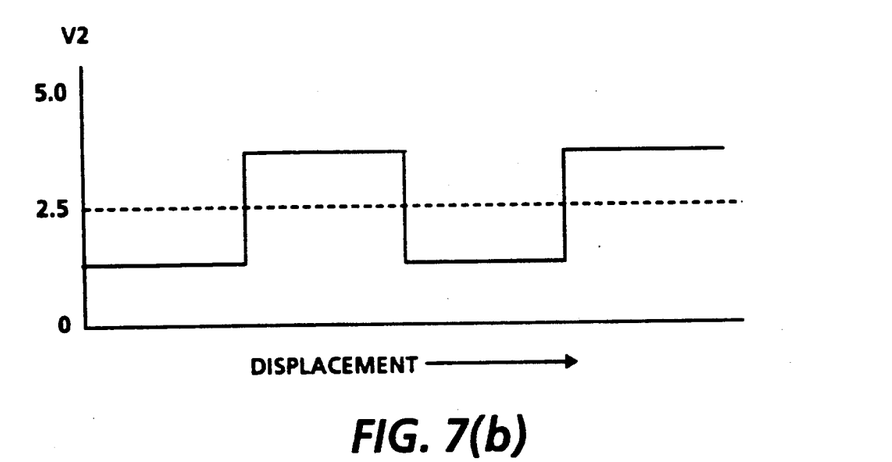

In the circuit of FIG. 6, voltage pattern V1 is then input to a differentiation circuit 64. The output waveform V2 of differentiation circuit 64, shown in FIG. 7(b), illustrates the triggering at zero slope points. Voltage pattern V2 is subsequently input to a high gain comparator 65. Voltage pattern V0 is produced in the form of a saturated square wave with transition points that are invariant to the peak to peak amplitude of voltage pattern V1 and to the speed of the printhead relative to the media within reasonably large limits as determined by the circuit parameters of FIG. 6. Accordingly, output voltage pattern V0 is not dependent on the amplitude of a reference signal, as in the conventional approach shown in FIG. 5.

Figure 8:
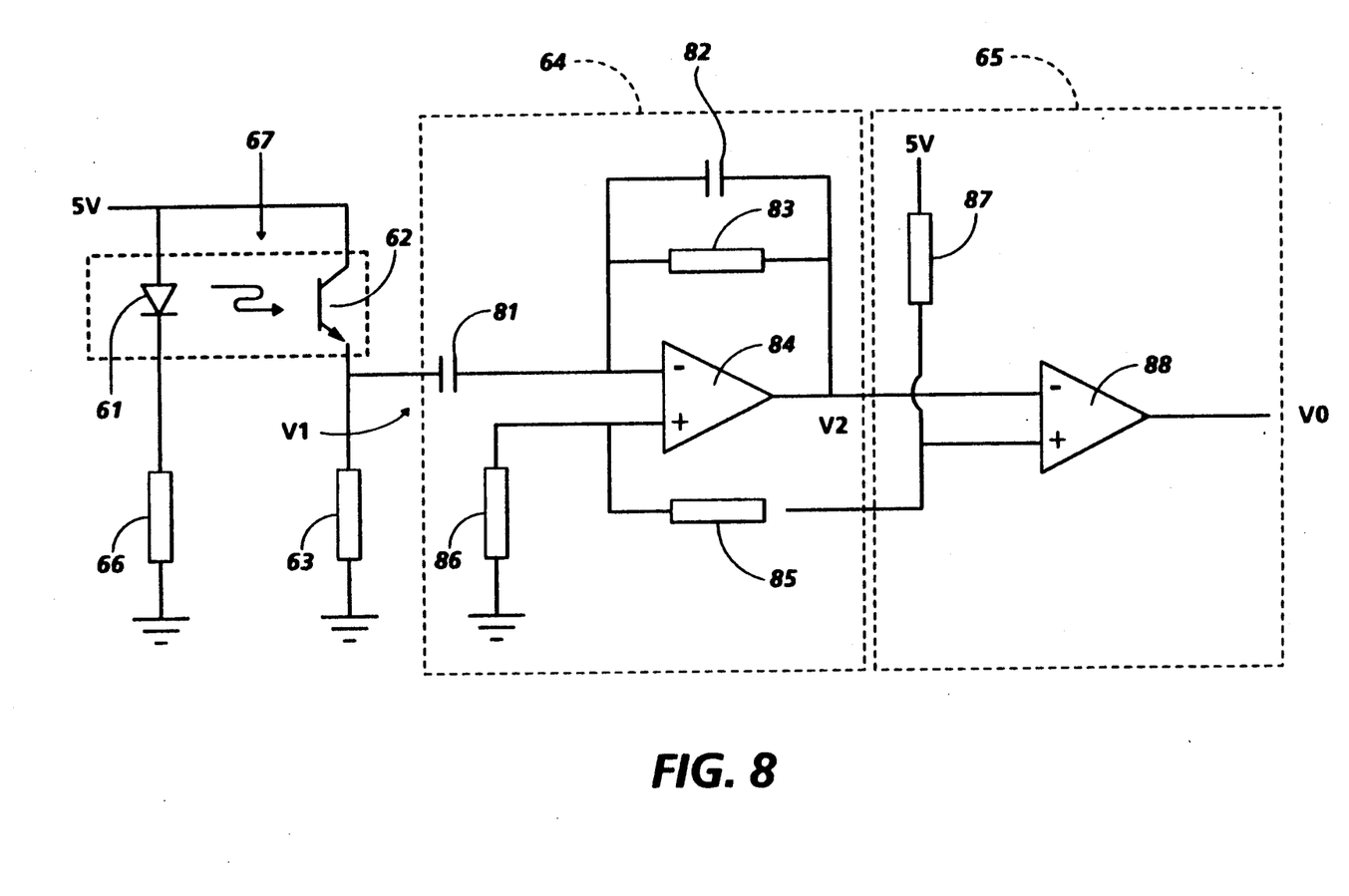
FIG. 8 is an exemplary circuit of the printhead encoder shown in FIG. 6.

FIG. 8 illustrates an exemplary circuit of the block diagram illustrated in FIG. 6 where like components are indicated by the same reference numerals. FIG. 8 shows voltage pattern V1 across resistor 63 output to capacitor 81. Capacitor 81 cuts off the DC component of voltage pattern V1, thus making the device relatively insensitive to constant levels of ambient illumination. Differentiation circuit 64 comprises capacitor 82, resistor 83, op-amp 84, and resistor 85, which produce output waveform V2. Voltage pattern V2, shown in FIG. 7(b) goes alternatively and suddenly high and low at the maximum and minimum points of the voltage pattern V1, shown in FIG. 7(a). That is, voltage pattern V2 is a square wave, symmetrical about 2.5 V, which is triggered at the zero slope points of voltage pattern V1. Resistor 85 is added to insure that the voltage goes high when the scanner is in the non-printing area at one of the ends 28 or 29 of plastic film strip 2.

Figure 7C:
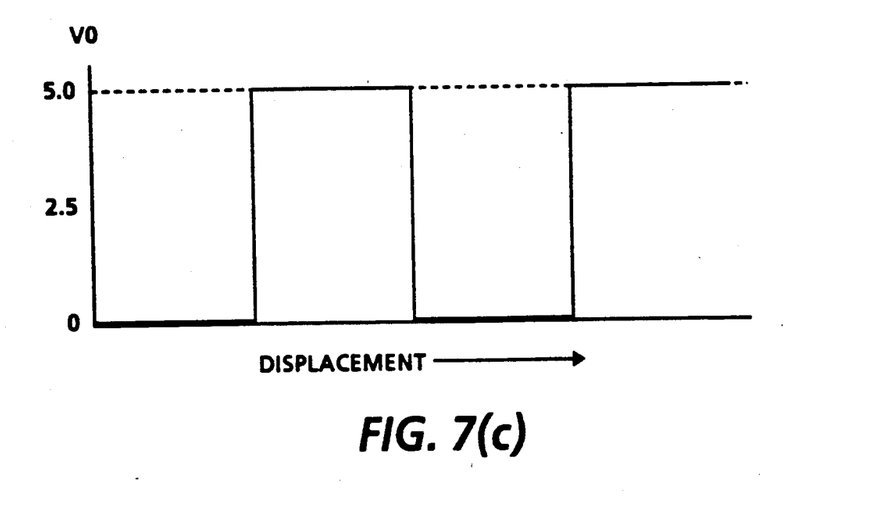

Voltage pattern V2 is then input to comparator 65 which is comprised of op-amp 88, in the non-feed back mode, which outputs an alternating 5 volt and 0 volt saturated square wave, shown in FIG. 7(c). The output pattern V0 goes high when the voltage V2 is greater than 2.5 V and goes low when the voltage is lower than 2.5 V.

Since the above described scheme relies on triggering at the maximum and minimum points of the phototransistor waveform, it will be insensitive to constant ambient illumination up to the point when saturation of V1 occurs.

Moreover, in the present invention optical contamination, component degradation, and thermal effects from paper fibers, ink, and other similar materials do not have as significant an effect on the triggering of the sensor as the conventional technique illustrated in FIG. 5, because the triggering does not rely on the amplitude of a voltage pattern. Accordingly, the output of the printhead encoder of the present invention will be invariant with respect to amplitude over a much wider range than conventional printhead encoders which depend on the absolute level of their output for proper operation. Additionally, the plastic film strip 2 used in the present invention with the fiducial marks 21 and spaces 22 is far less affected by ambient illumination and contamination.

It should also be noted that although the preferred embodiment of the present invention discussed above relates to a printhead encoder, the encoding scheme of the present invention may also be employed in scanning applications where a sense head traverses a document and digitizes the information located on the document.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A printhead encoder including a scanning nip for achieving pixel to pixel registration when scanning a medium to be imprinted comprising:

means for providing a sensing beam;

means for causing interruptions in the sensing beam when scanning the medium to be imprinted;

means for detecting the interruptions and for producing a first voltage pattern based on the interruptions; and     means for outputting a second voltage pattern which is triggered at zero slope points of the first voltage pattern.

2. A printhead encoder as recited in claim 1, wherein the means for causing interruptions in the sensing beam is a plastic film strip including:

a plurality of equally spaced and dimensioned fiducial marks which extend transverse to the length of the plastic film strip; and     first and second non-printing ends which are optically non-transmissive.

3. A printhead encoder as recited in claim 2, wherein said means for outputting a second voltage pattern is a differentiation circuit, with a supply voltage, including:

an op-amp with a positive and a negative input;

a first resistor, comprising a portion of a voltage divider, with a desired resistance value connected to the positive input such that the output of the op-amp is at or near one-half o the supply voltage when the first and second non-printing ends are in the scanning nip.

4. A printhead encoder as recited in claim 1, further comprising:

comparator means for comparing the second output voltage pattern with a reference voltage and for outputting a third voltage pattern, and biased with a second resistor of the voltage divider such that an output of the comparator is high when the first and second non-printing ends are in the sensing nip.

5. A printhead encoder as in claim 4, wherein the third voltage pattern is a saturated square wave.

6. A printhead encoder as recited in claim 2, wherein the plastic film strip is constructed of a plastic material with a high optical transmissivity.

7. A printhead encoder as recited in claim 2, wherein the plurality of equally spaced and dimensioned fiducial marks are opaque fiducial marks.

8. A method for achieving pixel to pixel registration when scanning a medium to be imprinted, using a printhead encoder, comprising the steps of:
    emitting a sensing beam;
    causing interruptions in the sensing beam when scanning the medium to be imprinted;
    collecting the interrupted sensing beam through an aperture;
    detecting the collected interruptions and producing a first voltage pattern based on the interruptions; and
    outputting a second voltage pattern which is triggered at zero slope points of the first voltage pattern.

9. A method for achieving pixel to pixel registration, using a printhead encoder, as recited in claim 8, the step of causing interruptions further comprising the steps of:
    causing interruptions in the sensing beam when scanning the medium to be imprinted with a plastic film strip with a plurality of equally spaced and dimensioned fiducial marks which are optically non-transmissive.

10. A method for achieving pixel to pixel registration, using a printhead encoder, as recited in claim 8 further comprising the steps of:
    comparing the second voltage pattern with a reference voltage and outputting a third voltage pattern, wherein the third voltage pattern is a saturated square wave; and
    using transitions of the saturated square wave to trigger printing.

* * * * *